(12) United States Patent
Juhl et al.

(10) Patent No.: US 8,363,660 B2
(45) Date of Patent: Jan. 29, 2013

(54) ARRANGEMENT AND METHOD RELATING TO IDENTIFICATION OF HARDWARE UNITS

(75) Inventors: Michael Juhl, Them (DK); Peder Jorgensen, Holstebro (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 453 days.

(21) Appl. No.: 12/513,753

(22) PCT Filed: Nov. 9, 2006

(86) PCT No.: PCT/SE2006/050462
§ 371 (c)(1),
(2), (4) Date: Nov. 16, 2009

(87) PCT Pub. No.: WO2008/057019
PCT Pub. Date: May 15, 2008

(65) Prior Publication Data
US 2010/0091779 A1   Apr. 15, 2010

(51) Int. Cl.
*H04L 12/28* (2006.01)
*H04L 12/56* (2006.01)
*H04J 3/24* (2006.01)
(52) U.S. Cl. ............... 370/395.54; 370/395.3; 370/400; 370/401; 370/475
(58) Field of Classification Search .................. None
See application file for complete search history.

(56) References Cited

U.S. PATENT DOCUMENTS

| 2002/0165972 | A1 | 11/2002 | Chien et al. |
| 2003/0101243 | A1 | 5/2003 | Donehue et al. |
| 2004/0003292 | A1 | 1/2004 | Kato |
| 2004/0111640 | A1 | 6/2004 | Baum |
| 2004/0122944 | A1 | 6/2004 | Poirot et al. |
| 2004/0125923 | A1 | 7/2004 | See et al. |
| 2004/0141609 | A1 | 7/2004 | Shi |
| 2007/0022469 | A1* | 1/2007 | Cooper et al. ................. 726/3 |
| 2008/0212598 | A1* | 9/2008 | Kolli et al. .................... 370/409 |
| 2010/0332615 | A1* | 12/2010 | Short et al. .................... 709/217 |

FOREIGN PATENT DOCUMENTS

| EP | 1 589 705 A2 | 10/2005 |
| EP | 1 622 398 A1 | 2/2006 |
| WO | WO02076017 A2 | 9/2002 |

OTHER PUBLICATIONS

Nortel Networks, Nortel Networks Wireless Solutions Sep. 2000 The Shasta 500 BSN is uniquely positioned to effectively target the emerging wireless Internet, Solution Sheet, Version #94003.02/10-00.

* cited by examiner

*Primary Examiner* — Phirin Sam
*Assistant Examiner* — Sori Aga

(57) ABSTRACT

A switching node in a distributed transmission network. The node, which is assigned a unique switching node identity (SID) includes a number of switch ports for connection of a number of line boards with subscriber line ports. The node detects a request for an IP address from a line board and identifies the switch port on which the request is received. The node generates an extended IP address request message by adding information about the SID and the receiving switch port over which the IP address request was received. The node forwards the extended IP address request message to a control unit within the node or to an external switching control node.

15 Claims, 10 Drawing Sheets

STATE OF THE ART

ARRANGEMENT AND METHOD RELATING TO IDENTIFICATION OF HARDWARE UNITS

TECHNICAL FIELD

The present invention relates to switching nodes, switching control nodes and switching networks with a distributed node topology and to methods in such networks for identification of hardware units.

BACKGROUND

Today there is an increasing demand for implementation of new and fast access technologies and transmission technologies. There is also a demand for a capability to mix different access technologies. ADSL (Asymmetric Digital Subscriber Line) is a high speed transmission technology using copper wires from a central office to subscriber premises. It has a high downlink capacity and a considerably lower uplink capacity. The technology has evolved among others resulting in VDSL (Very high data rate Digital Subscriber Line), but the transmission speed goes down considerably with the length of the copper wire and the sites or line boards have to be located close to the end user. In for example an Ethernet network topology comprising a number of switches or switching nodes and end-user line boards, for example implementing VDSL (e.g. VDSL(2)), it is very important that the subscriber terminations are known by the management system or the operator in order to be able to offer a correct subscriber configuration. If it is not possible to locate and to identify which are the IP addresses of the line boards that are associated with the subscriber terminations, it is not possible for a management system or an operator to handle IP management operations for example over SNMP (Simple Network Management Protocol) of the correct switching node to manage and configure subscriber connections for example over a VDSL line. Today existing solutions comprise an access node arrangement based on a fixed Ethernet setup, and are based on physical cabling and learning of MAC (Medium Access Control) addresses in order to detect the topology. Such an access node arrangement comprises a controlling node or an aggregation switch handling for example private IP addresses, inventory, alarms etc. and controlling of line boards either directly or over aggregation switches or, more generally switching nodes.

In known systems the equipment is provided at the central office, which can be located far away from the end-users, and a fixed line board port numbering per termination is used. This means that is not possible to provide for an extension e.g. with a new level. In known solutions MAC tables are provided in the switching nodes and reading of MAC tables is required for topology learning purposes. This is possible for small access nodes in for example a fixed Ethernet topology or similar since the number of switching levels is limited. If for example larger access node arrangements are needed which are based on distributed topologies, such as for example ring structures with many small sites (here a site means a switching node and line boards), it gets very complicated and slow to base topology learning on reading of MAC tables mapping a MAC address of a line board to an IP address of the line board. Thus, hitherto it has been necessary to read MAC tables in the switching nodes, or aggregation switches, for registering a hardware unit in the management system. In order to identify a subscriber to perform a management operation it is necessary to obtain knowledge about the used topology type, if there is a change of topology, if a new topology has been registered etc. This has to be established in the management system for each request, which is very disadvantageous in that it is time consuming, laborious and requires a lot of management traffic.

Another disadvantage of existing solutions is that there will always be a delay in the switching arrangement when a MAC address has to be looked up and until for example an SNMP agent in the host CPU (Central Processing Unit) is updated (which is common for all switches).

Still another disadvantage is that some switches start switching traffic before the SNMP agent is started and updated. Then it will not be possible to immediately trace the origin of for example a DHCP (Dynamic Host Configuration Protocol) message and therefore it might not even be possible to detect the topology.

It is clear that such solutions are, if not entirely inapplicable, at least very disadvantageous, slow and prone to errors when new access technologies are introduced (e.g. requiring sites to be close to the end users) and when it is desired to be able to mix different access technologies and line board types.

SUMMARY

It is therefore an object of the present invention to provide a solution to the above mentioned problems and to provide an architecture or an access node arrangement that supports the introduction of new access technologies, for example VDSL, VDSL(2) or other access technologies and which also supports mixing of different access technologies and line board types. It is also an object of the present invention to provide an access node arrangement, a switching node, a switching control node and a method respectively through which identification of hardware units in distributed topologies is enabled or facilitated. Most particularly it is an object of the invention to provide a solution through which subscriber terminations or hardware units can be identified and recognized in a fast, reliable and uncomplicated manner. It is also an object of the invention to provide a solution which enables easy, flexible, fast and correct management of subscriber terminals. Another object of the invention is to suggest a switching node, a switching control node, an access network structure and a method capable of handling new generation access technologies and of handling topologies with a large number of small sites close to the end users and a topology which evolves.

It is therefore provided a switching node which is adapted to be arranged in a distributed transmission network, which comprises processing means and which is adapted to be connected to a switching control node or itself comprise a switching node control functionality, further comprising a number of switch ports for connection of a number of line boards (in turn having a number of subscriber line ports). According to the invention the switching node is adapted to be assigned a unique switching node identity, i.e. to be uniquely identifiable by means of a unique switching node identity. The switching node further comprises detection means for detecting an IP address request message and for identifying over which switch port the said request is received. The switching node further comprises means for adding information about the unique identity of the switching node and information about receiving switch port, i.e. the switch port on which the IP address request message was received. The switching node further is adapted to forward said request provided with said additional information, also called the extended request, to the switching control node or to the switching node control functionality, if implemented in a switching node.

In one embodiment the IP address request message comprises a DHCP (Dynamic Host Configuration Protocol) request, or particularly a DHCP Discovery Broadcast message. The switching node is in a most advantageous implementation adapted to implement a so called DHCP Interception Mechanism to provide the DHCP request with said additional information.

In an advantageous implementation said detection means comprises, at least conceptually, a filter or a specific filter rule for filtering out IP address requests (or DHCP Discovery Broadcast messages), particularly if they are to be provided with said additional information as referred to above. It is also possible to conceptually implement a network identifying filter or filter rule for distinguishing between the origination of IP address request messages which are to be extended, and/or to establish if they have already been extended in another switching node such that it can be established if it originates from another switching node. Alternatively it is only established if additional information is included or not; generally filters are not implemented in hardware.

Then, it is adapted only to process request messages to be extended received from a line board connected to the switching node itself (or simply non-extended request messages). This functionality can be provided for irrespectively of whether it has been detected that the IP address request is to be provided with additional information or not, or it can be implemented to follow detection of whether a request message is to be extended or not and preferably only performed for those IP address request messages that are to be extended. The detection means are preferably adapted to forward a detected and identified IP address request message to the processing means of the switching node or to a dedicated processing means. In a structure in which the inventive concept is extremely advantageous to implement, the switching node is connected to at least one other switching node. It may be connected to a plurality of other switching nodes directly or directly and indirectly over another switching node and/or directly and indirectly over the, or a, switching control node. This means that the switching nodes can be arranged based on a number of different topologies, a ring topology, a star topology or a daisy topology, alone or in any combination. The switching nodes, also called aggregation switches, are preferably preprogrammed with a unique ID. In one embodiment the ID is software defined. In an alternative implementation it is hardware defined, for example by means of so called DIP (Dual In-line Package) switches which is advantageous and provides an even more flexible solution since it makes it possible for a technician to replace the switching node without having to attach any external equipment for software programming. Then particularly only the positions of the for example DIP switches need to be copied to the new unit.

It should be clear that the inventive concept is not limited to such structures but that the invention also can be implemented in structures with switching nodes which are not interconnected but simply arranged at different levels below a switching control node. This of course reduces provisioning of redundancy etc. but it still has the advantage that it is not necessary to look up MAC addresses etc. Line boards can for example still be easily replaced.

In advantageous embodiments the switching node comprises examination or parsing means for establishing, upon reception of a request for an IP address, if the option of adding information, or extending request message, is available or not, and to, if the option is available, examine if the message is extended to include the additional information or not, and if not, to add said additional information. Preferably the examination means in the processing means are adapted to introduce the option of adding information if it is not already included and then to add the relevant additional information. Through this examination or parsing it gets possible to distinguish between IP address request messages coming directly for example from a line board or from another switching node with which the switching node itself is in communication, indirectly since they hence already have been provided with relevant additional information. Then, in the latter case, of course, the switching node should not add any information but simply forward the message without any processing. If the option is available and there is no additional information, it can however be concluded that the request has been provided directly, i.e. without being provided by some intermediate switching node, to the switching node, why it has to add its own additional information, i.e. switching node identity and receiving port information. Preferably the processing means of the switching node are adapted to provide for broadcast of the extended request message on all switch ports, with the exception of the switch port on which is was received, in order to avoid possible loops. Preferably the processing means, or additional calculation means, are adapted to recalculate the previously calculated different checksums to avoid possible packet drop since if additional information has been added, already calculated checksums will no more be correct.

The switching node may comprise a so called aggregation switching node adapted to be provided in an Ethernet or similar network with a ring, star or daisy topology or a mixture thereof. In one implementation the switching node also comprises the functionality of a switching control node, or a switching control node functionality. Then it is additionally adapted to provide an IP address and to map the additional information to the IP address and it further comprises storing means for holding the IP address and the additional information mapped onto it, i.e. which is the unique node identity and information about the switch port. Alternatively, or additionally, this control functionality is provided in a switching control node which may be arranged at a central office as will be discussed below.

The invention thus also suggests a switching control node adapted to be arranged in a distributed transmission access network and which is adapted to control a number of switching nodes. (It should however be clear that the inventive concept is not limited to include the provisioning of such a control node.) The switching control node comprises IP address allocation and mapping means for allocating an IP address upon reception of an extended IP address request message from a switching node, which extended message hence is extended with additional information comprising a unique identity of the switching node and information about current request receiving port of the switching node. The switching control node further comprises storing means for storing the mapping information comprising the allocated IP address and the unique switching node identity and receiving switch port, for example a mapping table or similar.

Particularly the switching node comprises separate ports for each or a number of switching nodes which it is adapted to control and which may, but do not have to, be interconnected and, for example be arranged in a ring, star or daisy topology or a mixture thereof. The switching node is adapted to provide or allocate IP addresses dynamically.

The invention also suggests an access or transmission network with a number of switching nodes and possibly at least one switching control node or a switching node with a switching control node functionality, wherein the respective switching nodes comprise a number of switch ports for connection of a number of line boards each with a respective number of subscriber connection ports. According to the invention the switching nodes are adapted to be uniquely identifiable by means of unique switching node identities, i.e. assigned unique switch identities (SID), which preferably are preprogrammed (hardware or software defined) and wherein a respective switching node is adapted to, upon reception of an IP address request message, add information to the IP address request message about the unique switching node identity and information about on which port the request message is received, and, preferably, to forward the hence extended message to the switching control node or a node with a switching control functionality. Said switching control node is adapted to map said additional information onto an IP address and to store said information (IP address and additional information) in a storing means, for example a mapping table.

The invention also suggests a method of handling messages comprising a request for an IP address in an access transmission network wherein network nodes are arranged according to a distributed node topology. The method comprises the steps of, upon reception of a message requesting an IP address in a switching node comprising a number of switch ports for connection of a number of line boards; adding information to the request message comprising an assigned unique switching node identity and information relating to the switch port on which the message was received; preferably forwarding the hence extended request message to a switching control node controlling said switching nodes or to a switching node with such a functionality; and generally on to the other switch ports of the switching node except the port on which it was received, mapping the additional information of an extended request message to an IP address in said switching control node or similar; storing the mapping information comprising assigned IP address and additional information in storing means.

Still further the invention provides a method for enabling identification of hardware units, for example subscriber terminations, in a distributed access network topology with a number of switching nodes and at least one switching control node wherein each switching node comprises a number of switch ports for connection of line boards, each line boards comprising a number of ports for hardware unit connection. The method comprises the steps of assigning, to each switching node, a unique identity; adding information about the switching node identity and about the receiving switch port upon reception of a request message for an IP address in a switching node over a receiving switch port; providing the hence extended request message directly to a switching control functionality (node) or indirectly thereto over intermediate interconnected switching node or switching nodes; mapping the additional information, i.e. the receiving switch port and the uniquely defined switching node identity onto an IP address; storing the mapping information, i.e. the allocated IP address and the uniquely defined switching node and its receiving switch port.

The embodiments described with reference to the switching node are of course also applicable, as far as relevant, to the switch control node, the network and the methods. It is an advantage of the invention that a solution is provided which allows for an easy and cost efficient (low cost) management of subscriber terminations, particularly for access networks using different access technologies and line board types, e.g. new access technologies such as for example VDSL(2). Particularly it is also an advantage of the invention that a switching node, a switching control node, or access transmission network respectively is provided wherein management can be handled in a cheap and easy manner also when there is a large number of small sites (comprising switching nodes and line boards) located close to the end user (and far away from a central office or central node).

Generally it is an advantage that identification of hardware units in distributed node topologies is considerably facilitated. It is also an advantage of the invention that a scalable solution is provided which does not impose any special requirements on the transmission network. Still further it is an advantage that installation and replacement etc. of line boards (or switching nodes) can be made in a very easy and fast manner without requiring any specific skill of the person carrying out the installation or replacement. It is also extremely advantageous that it gets possible to keep the same line numbering, particularly even if there is a very large number of small sites, if the architecture is extended or modified. It is also an advantage that line numbering or identification of subscriber terminations need not be changed and can be kept even if the network topology or the architecture is changed, for example simply extended or reduced or modified from one topology to another or extended with still another topology etc. It is also an advantage that hardware units or terminations can be identified without having to do any search operations in so called MAC tables and that a management system will be capable of identifying which subscriber terminations that will be associated with each IP address. There is no need for a management system to have any knowledge about the topology that is used.

BRIEF DESCRIPTION OF THE DRAWINGS

The invention will in the following be further described in a non-limiting manner, and with reference to the accompanying drawings, in which.

DETAILED DESCRIPTION

Figure 1:
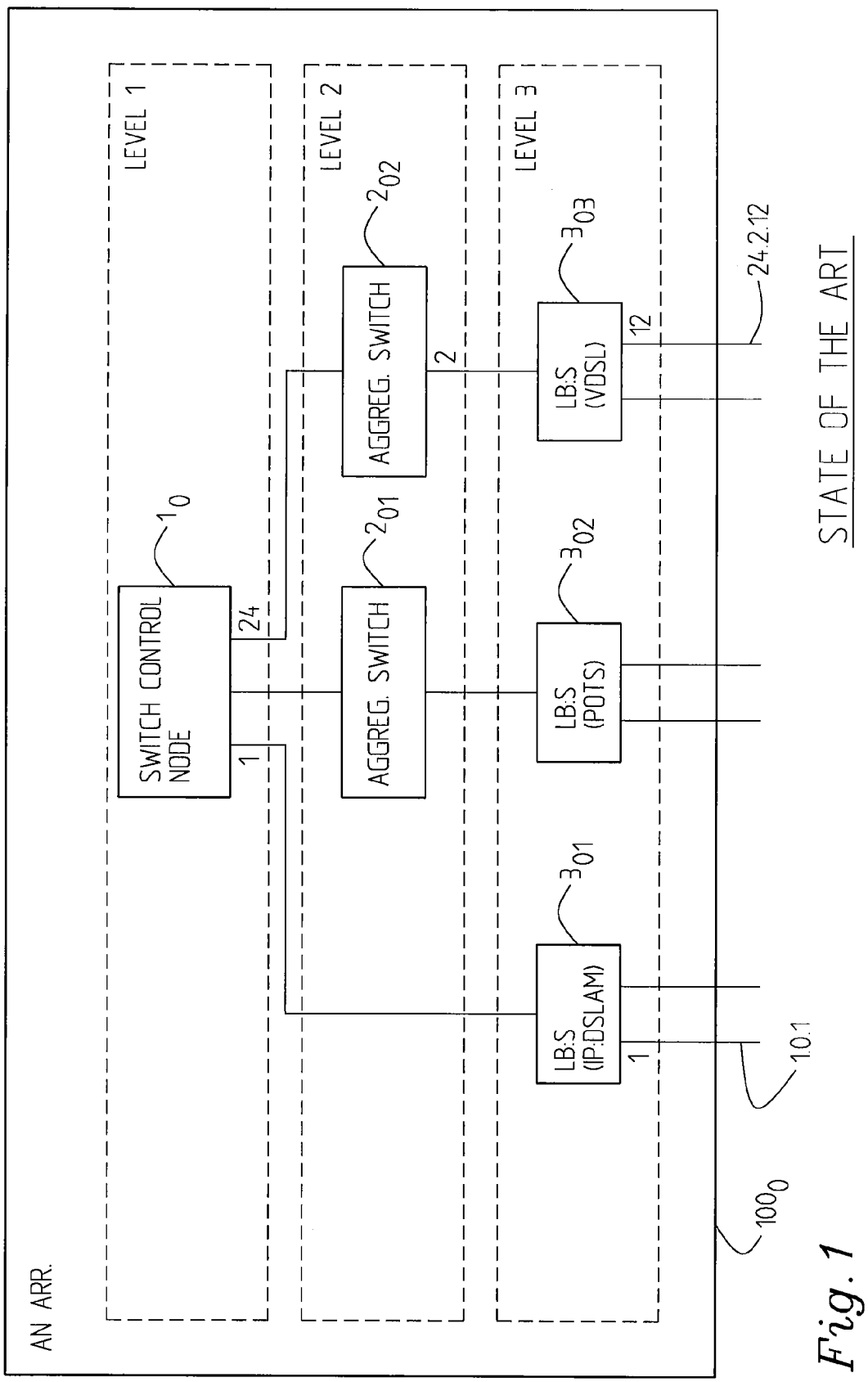
FIG. 1 shows an access node arrangement comprising a fixed Ethernet network setup according to the state of the art.

FIG. 1 shows an access node arrangement $100_0$ according to the state of the art. It comprises a fixed Ethernet topology with three levels. On the first level there is provided a switch control node $1_0$ which controls a number of aggregation switches $2_{01}$, $2_{02}$ and three line boards $3_{01}$, $3_{02}$, $3_{03}$; one of which line boards $3_{01}$ directly without any intermediate aggregation switch. A number of POTS (Plain Old Telephony Service) line boards $3_{02}$ are connected to aggregation switch $2_{01}$ and to aggregation switch $2_{02}$, port 2, are connected a number of line boards $3_{03}$ for VDSL access. Port 24 of the switching control node $1_0$ is connected to aggregation switch $2_{02}$ to which, over port 2, is connected line board $3_{03}$ with a subscriber termination on port 12. Port 1 of the switching control node $1_0$ is directly connected to IP DSLAM (IP Digital Subscriber Line Access Multiplier) with a subscriber termination on port 1, identified as termination 1.0.1. This is a solution based on physical cabling and MAC learning as discussed above for detecting the topology. Port numbering/termination is fixed, not possible to extend for example with a new level, as
<Controlling switch port>.<Aggr. switch port>.<Line board port>

For the indicated VDSL termination the port numbering is 24.2.12, i.e. port 12 on line board $3_{03}$, port 2 on aggregation switch $2_{02}$ and port 24 of the switch control node $1_0$.

Figure 2:
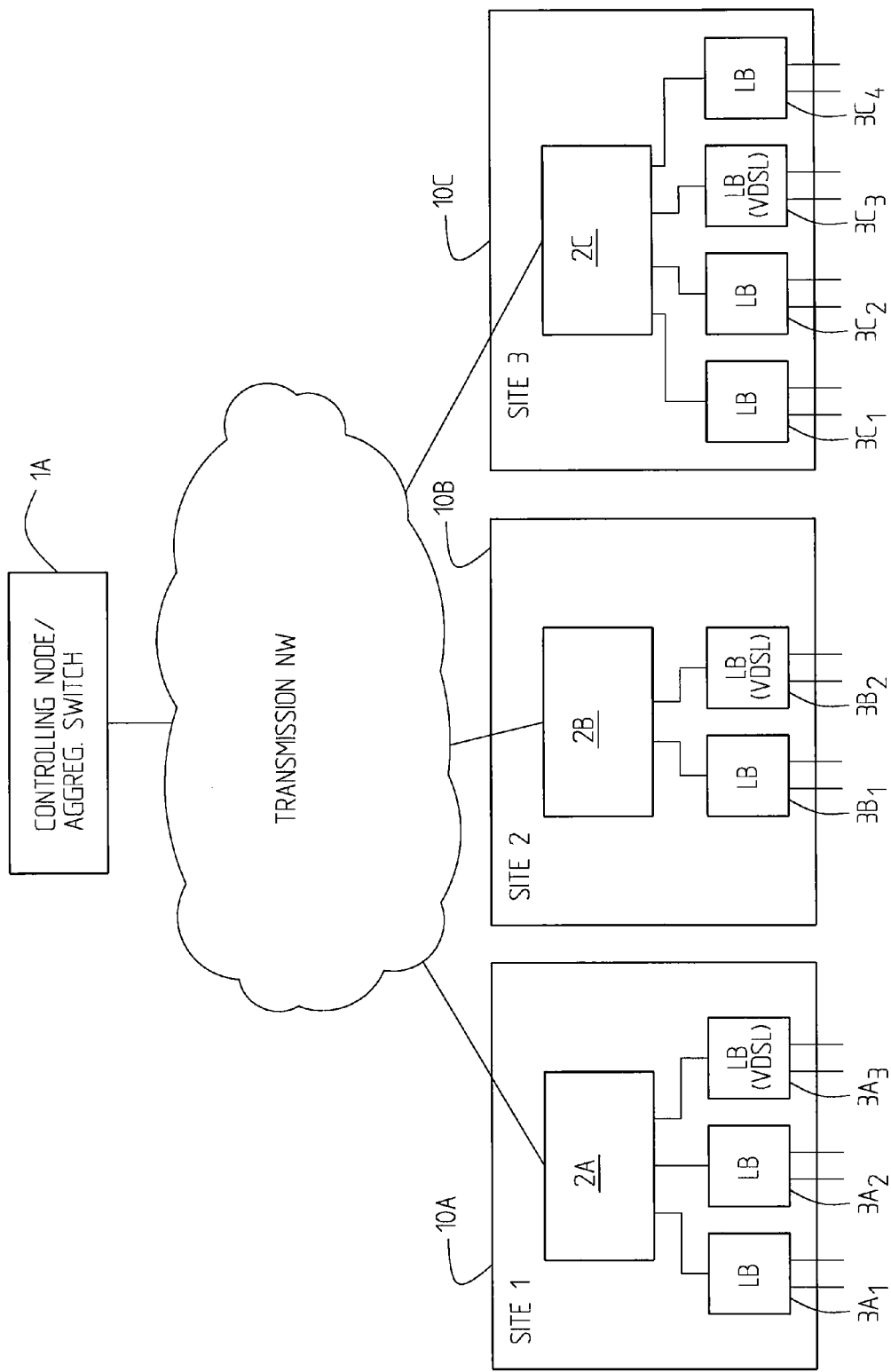
FIG. 2 is a schematical overview of an access node arrangement with a plurality of small sites in which the inventive concept is implemented.

FIG. 2 schematically illustrates an access node arrangement with a flexible architecture wherein the inventive concept is implemented as will be more thoroughly explained below. For example VDSL(2) is supported and it is also possible to mix different access technologies and line board types. Generally new access technologies require line boards to be closer to the end-user, which both means that there will be a larger number of sites as well as smaller sites than hitherto. The sites can be managed in an easy and cheap manner, and also easily modified, for example extended with a new access type, a new small site being added etc. These small sites are managed under what here is called an access node arrangement. As referred to above the distributed smaller sites (comprising a switching node or aggregation switch and line boards) must be possible to identify. It is also important to, if for example the architecture is extended, be able to keep the same line numbering, since it considerably facilitates the migration of the, for example, millions of lines already in service. FIG. 2 particularly illustrates three distributed small sites, site 1 10A, site 2 10B and site 3 100 each comprising a switching arrangement 2A, 2B, 2C respectively. At site 1 switching node 2A is connected to line boards LB $3A_1$, $3A_2$, $3A_3$, whereas to the switching node 2B at site 2 are connected LBs $3B_1$, $3B_2$, and finally to switching node 2C at site 3 are connected LBs $3C_1$, $3C_2$, $3C_3$, $3C_4$. The switching nodes 2A, 2B, 2C are connected via a switched transmission network, for example an Ethernet and controlled by controlling node/aggregation switch 1A. Each small site may for example handle approximately 10-100 lines or subscriber terminations.

The sites and the transmission network may of course be handled by different operators or service providers.

Figure 3:
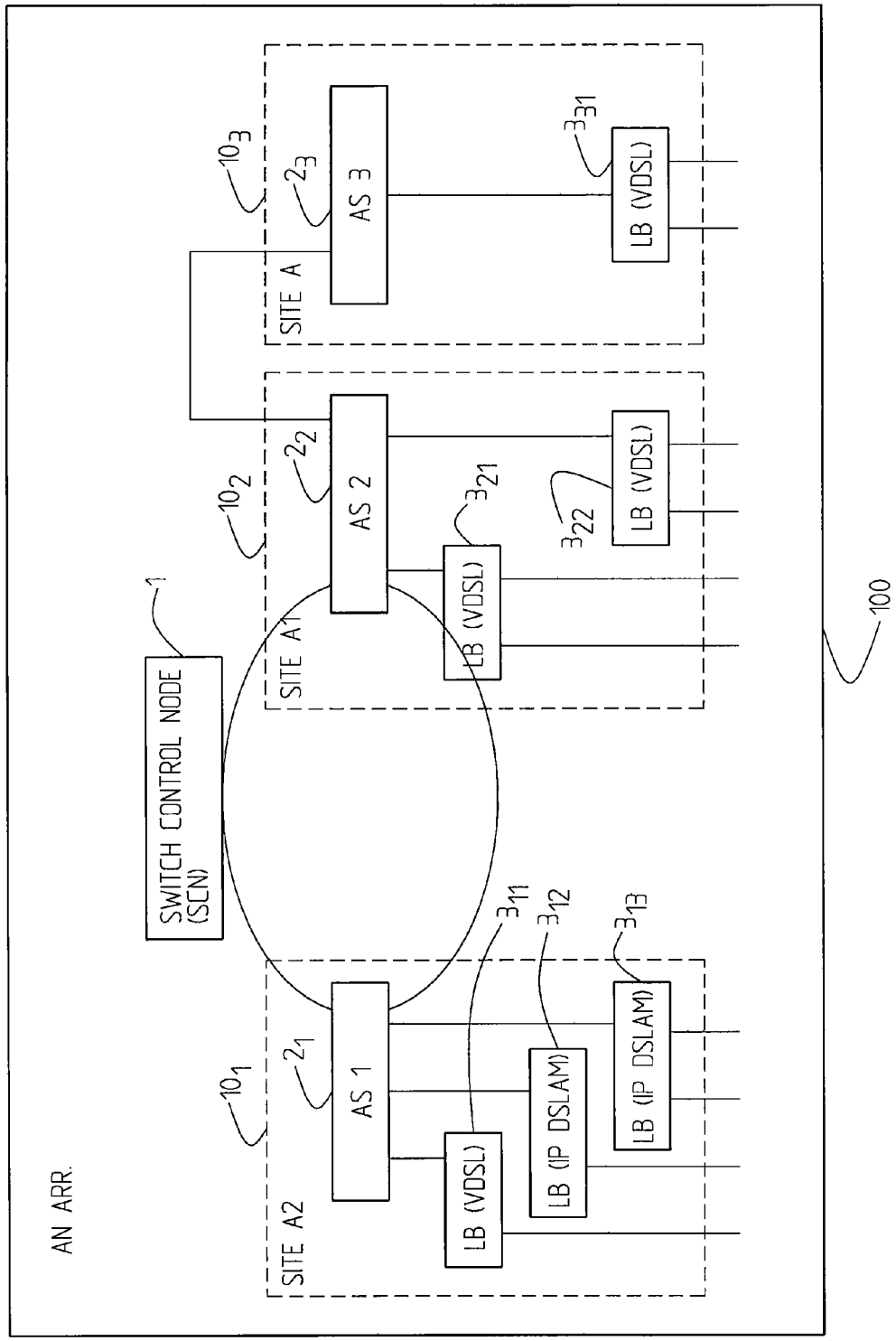
FIG. 3 is a schematical block diagram of an access node arrangement comprising distributed nodes according to a particular embodiment of the present invention.

FIG. 3 shows an exemplary access node arrangement 100 according to the present invention. It comprises a switch control node (SCN) 1 controlling aggregation switches AS1 $2_1$, AS2 $2_2$ and AS3 $2_3$. AS1 $2_1$ is provided at site A2 $10_1$. Connected to it are here VDSL line board $3_{11}$, IP DSLAM line board $3_{12}$ and IP IDSLAM line board $3_{13}$, all provided at site A2 $10_1$. Correspondingly AS3 $2_3$ and LB (VDSL) $3_{31}$ is arranged at a site A $10_3$ whereas AS2 $2_2$ and line boards LB (VDSL) $3_{21}$ and LB (VDSL) $3_{22}$ are arranged at site A1 $10_2$. It is here supposed that it is a mixed Ethernet transmission network which is ring (AS1, AS2) and daisy (AS2, AS3) chained. According to the inventive concept preferably DHCP interception is implemented in processing means (not shown in FIG. 3; cf. FIGS. 7,8) in the respective aggregation switches upon reception of a DHCP discovery broadcast message from a line board. In this application a DHCP discovery message is covered by the more general concept IP address request message. If such a message is detected and identified as such in the aggregation switch, it is intercepted in order to enable identification and representation of the line board management interface as will be more thoroughly described below. In the inventive procedure such discovery messages, also briefly denoted request messages are extended with information about identity of the respective aggregation switch to which the line board is connected as well as the switch port on which the request (i.e. particularly DHCP discovery message) was received. This makes it possible to have large networks with distributed nodes as shown herein since it is not necessary to trace the specific line board through the network at later operations on it. This also makes installation and replacement of line boards very easy and fast. In addition thereto the use of DHCP interception or similar provides for scalability since it does not put any special requirements on the transmission network; the only requirement is transparency for IP address request messages (e.g. DHCP discovery messages).

Through implementation of the inventive concept it becomes possible to change topology or architecture for example from daisy chained aggregation switches to a ring structure or vice versa or to add one topology to another etc. since the subscriber termination or line numbering will not be changed. From an operator point of view this will considerably reduce installation costs since it is only necessary to setup or configure unique identities in the respective aggregation switches in a distributed network and not in all nodes. For explanatory reasons the inventive concept will be described using the first level of switch aggregation in relation to the line boards only. It can be used in any switched transmission network, for example Ethernet, with more levels of switching and line boards and when IP addresses are provided dynamically.

Figure 4:
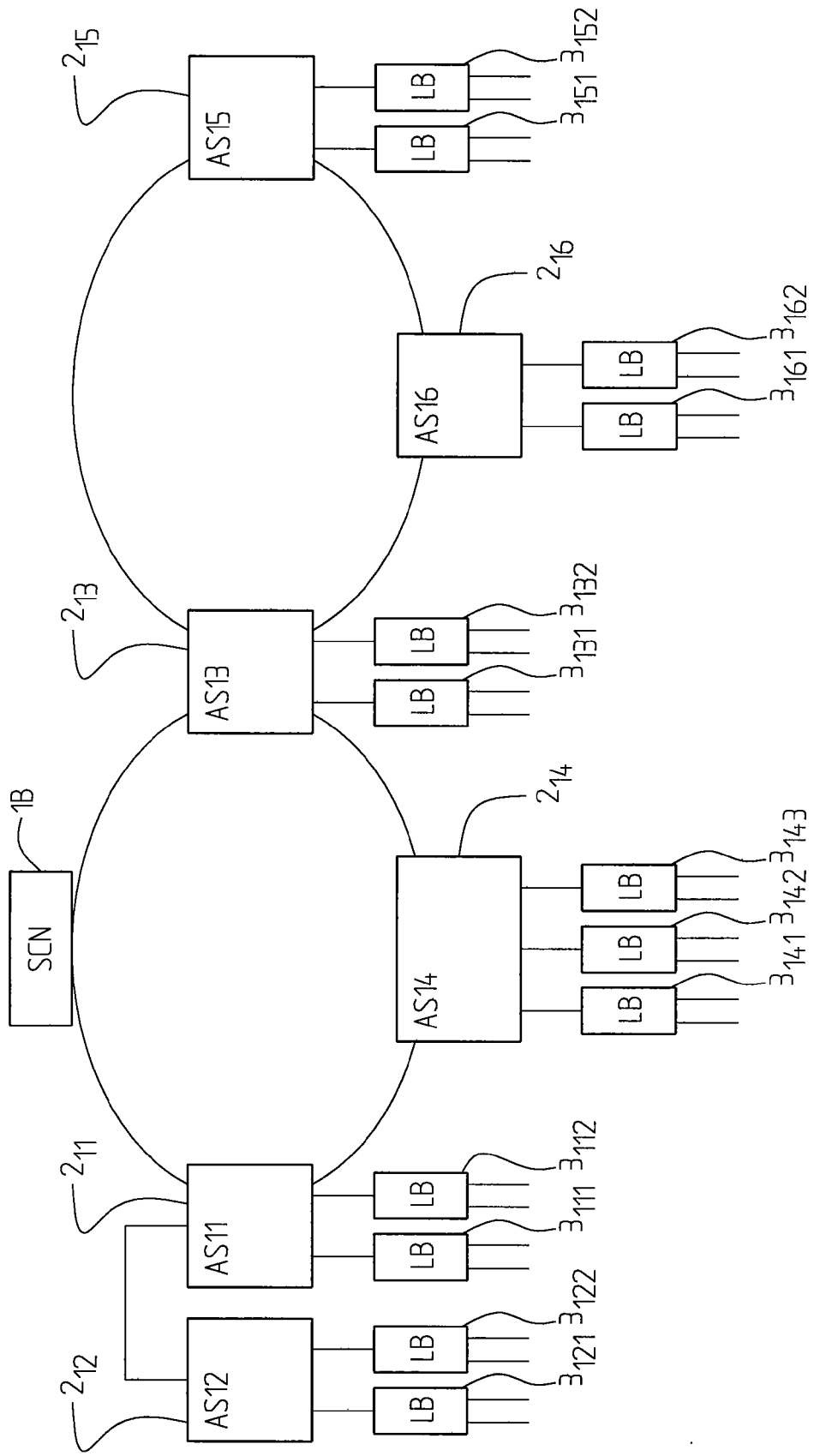
FIG. 4 shows a further example with a different topology for implementation of the inventive concept.

FIG. 4 schematically illustrates another example of a topology wherein the inventive concept can be implemented and which comprises an SCN 1B controlling AS11 $2_{11}$ with connected line boards $3_{111}$, $3_{112}$, AS12 $2_{12}$ with line boards $3_{121}$, $3_{122}$, AS14 $2_{14}$ with line boards $3_{141}$, $3_{142}$, $3_{143}$, AS13 $2_{13}$ with line boards $3_{131}$, $3_{132}$, AS15 $2_{15}$ with line boards $3_{151}$, $3_{152}$ and AS16 $2_{16}$ with line boards $3_{161}$, $3_{162}$; a mixture of two rings and a daisy chained AS (AS12).

Figure 5:
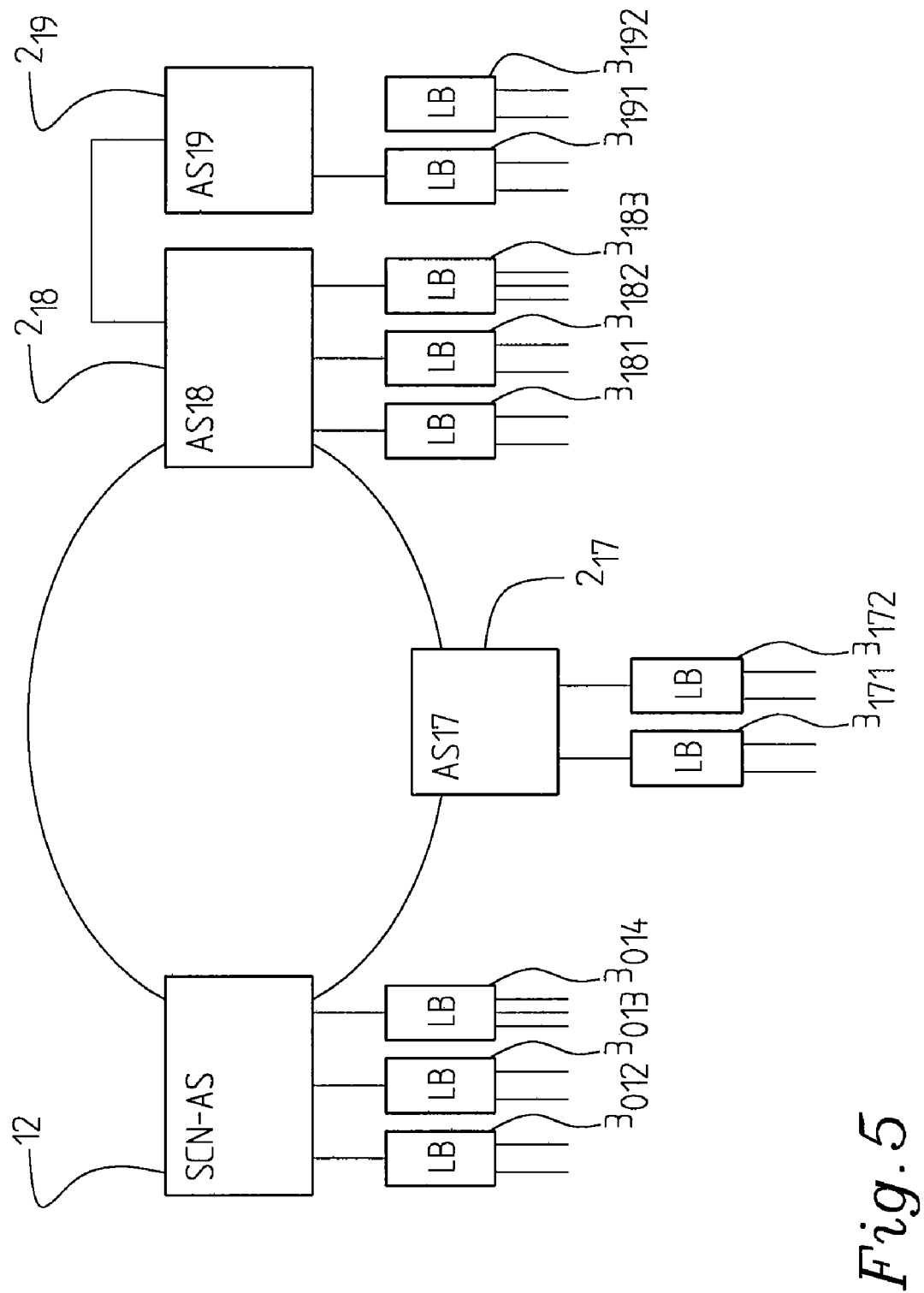
FIG. 5 shows an access node arrangement wherein one of the switching nodes also incorporates a switching control node functionality.

FIG. 5 shows still another example of a network topology wherein the inventive concept can be implemented. In this case the switch control functionality, in the other embodiments provided by a control node, see for example FIGS. 2-4, is instead provided in a combined switching node—switch control node SCN-AS12, to which here, over switch ports, line boards LB3 $3_{012}$, $3_{013}$, $3_{014}$ are connected. SCN-AS12 is connected to AS17 $2_{17}$ and to AS18 $2_{18}$ which are provided in a ring topology structure. AS 17, AS18 comprise ports to which line boards $3_{171}$, $3_{172}$ and $3_{181}$, $3_{182}$, $3_{183}$ respectively are connected. AS18 $2_{18}$ is connected to AS19 $2_{19}$ by means of a so called daisy chain. To AS19 $2_{19}$ line boards $3_{191}$, $3_{192}$ are connected. This figure has been included to specifically illustrate an embodiment with a combined aggregation switch—switch control node.

Figure 6:
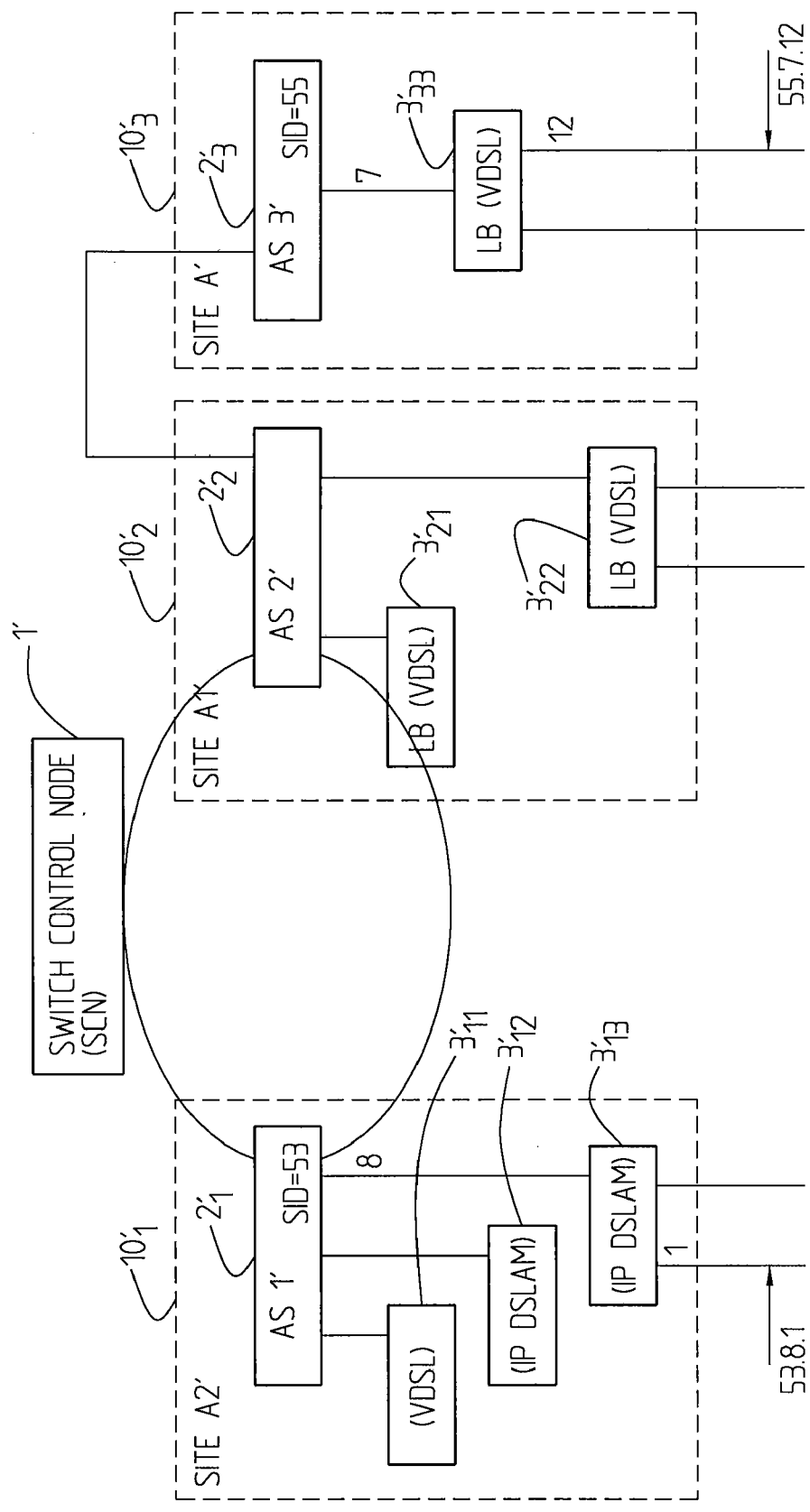
FIG. 6 illustrates one implementation of the inventive concept with distributed line boards in a mixed Ethernet network which is ring and daisy chained, FIG. 7 schematically illustrates an aggregation switch according to one implementation of the present invention and indicates a procedure when the line board is powered up, FIG. 8 schematically illustrates an implementation of a switching node and a line board.

FIG. 6 shows a topology similar to that of FIG. 3 illustrating how, according to the inventive concept, a subscriber can be identified.

As referred to above each aggregation switch is preprogrammed with a unique identity, here called SID (switch identity). AS1' $2_{1'}$ has been given an ID SID=53 whereas AS2' $2_{2'}$ has been given SID=54 (not shown) and finally AS3' $2_{3'}$ is identified as SID=55. The switch ID can be software defined or hardware defined, for example by means of so called DIP switches. If a hardware definition is used, a particularly flexible solution can be provided since it enables a technician to replace the switch without having to attach any external equipment for software programming. If particularly so called DIP switches are used, only the positions of said DIP switches need to be copied to the new unit in case of replacement. Port numbering/termination is as follows:
<Switch ID (SID)>.<Aggr. switch port>

Line board $3_{13'}$, is here connected to port 8 of AS1', to ports of which (not indicated) line boards $3_{11'}$ and $3_{12'}$ are connected. A subscriber line termination is connected to port 1 of line board $3_{13'}$. This particular subscriber line will then be identified as 53.8.1. In a similar manner line board $3_{33'}$ is connected to port 7 of AS3' with SID=55. The subscriber line connected to port 12 of line board $3_{33'}$ will then be identified as termination number 55.7.12. A managed switch (an aggregation switch) may normally be accessed using IP (Internet Protocol) protocols, for example UDP (User Datagram Protocol) for SNMP (Simple Network Management Protocol) access and using TCP (Transmission Control Protocol) for Telnet access. The switch fabric is programmed to forward specific packets, e.g. specific Ethernet packets to the CPU (Central Processing Unit) of the aggregation switch. The switch fabric can be programmed with different filters as discussed earlier. If a packet should be matched with a filter, the packet can be forwarded to the CPU (or discarded depending on the rule setup). This mechanism is normally used to forward relevant ARP (Address Resolution Protocol) messages, IGMP (Internet Group Multicast Protocol) control messages, broadcast messages and other packet types depending on the features supported by the switch. As discussed above an additional filter rule or an additional filter can be setup for identifying and forwarding e.g. DHCP requests (DHCP Discovery Broadcast messages) from a switch port to the CPU.

If management of the nodes is confined to a specific VLAN (Virtual Local Area Network), this VLAN may advantageously also be included in a filter setup. This will ensure that only relevant DHCP messages from managed nodes are intercepted and DHCP requests from subscribers in service VLANs are not unnecessarily charged with any irrelevant information.

Figure 7:
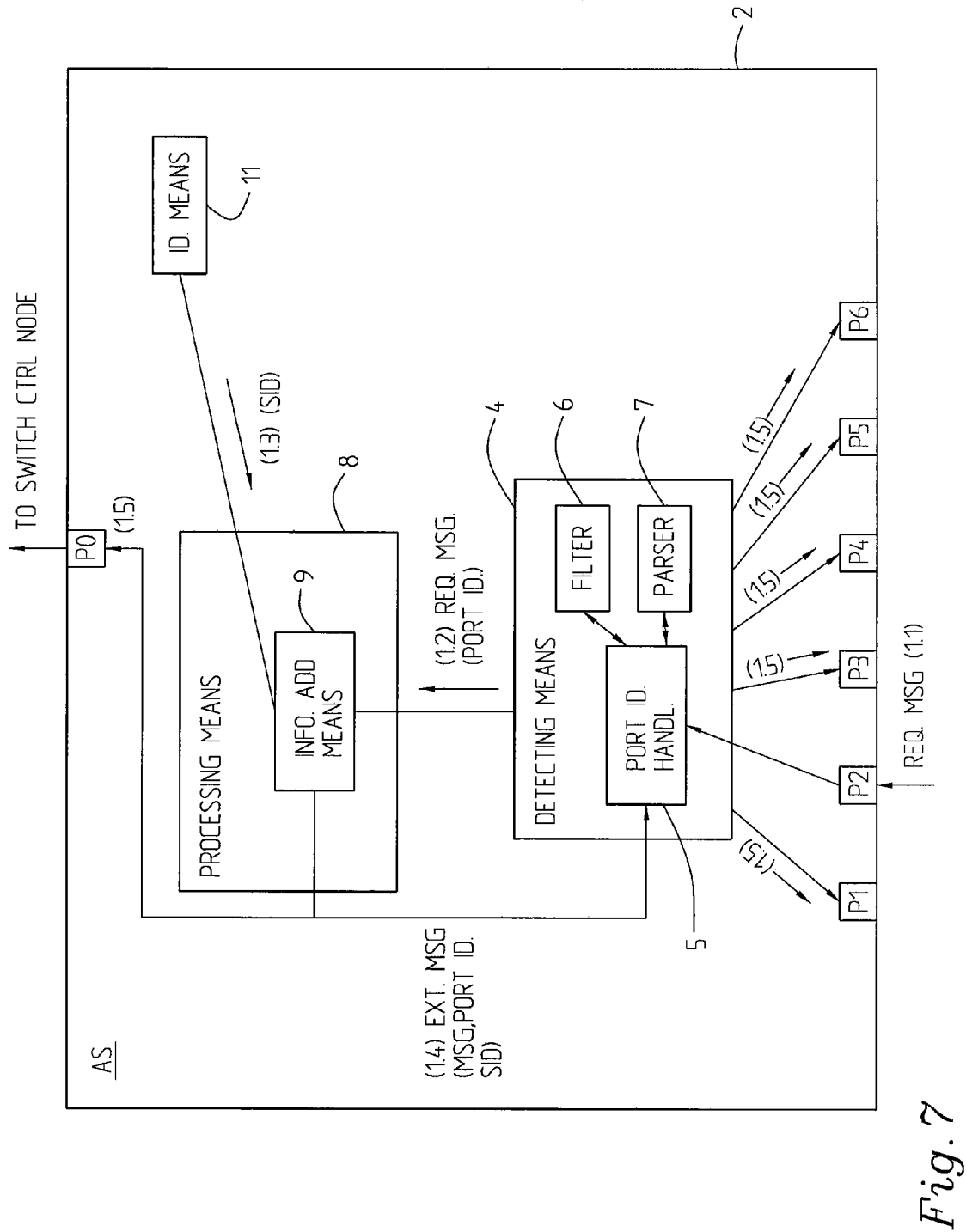

FIG. 7 is a block diagram showing an example of the procedure in an aggregation switch AS2 upon reception of an IP address request message, more specifically a DHCP discovery message broadcast, from a line board. For information only, the procedure when such a message is received in a conventional aggregation switch would be that the message is treated as a broadcast and simply forwarded to all other ports of the switch fabric, i.e. if it is received on board P2, it is forwarded directly, without any processing, by the switch fabric to all the other ports.

According to the present invention, however, upon reception of a request message on a port, here, P2 (1.1), the message is identified in detecting means 4 as being a DHCP discovery/message (for example also with VLAN identification to separate line DHCP and subscriber DHCP using a separate VLAN for management traffic to/from line boards) and forwarded to the processing means (host processors) 8 including information about the port on which the message was received, (1.2). As discussed above AS2 has been assigned an SID, which is supposed to be provided by identification means 11. As referred to above it can be a hardware implemented identification, or a software implemented identification. This is also provided to or fetched by the processing means 8 (1.3). The DHCP interception process then takes place in processing means 8 and consists of appending the SID to the DHCP message together with the port identification provided with request message (1.2.). From the processing means 8 the extended message (extended in that it also comprises information about receiving port and SID) is returned to port identity handling means 5 in detecting means 4. Port identity handling means 5 are here provided to establish information stating that the message should not be forwarded back on the port it was received on, here P2, but to all other ports P1, P3, P4, P5, P6 and also to port P0 to the switch control node (in this embodiment) (1.5). The port id handling means 5 may alternatively be provided in the processing means 8, or specifically in information adding means 9; alternatively the detecting means may be seen as incorporated in the processing means 8; FIG. 7 merely serves the purpose of giving a conceptual exemplary embodiment. The detecting means 4 used to detect DHCP discovery messages can be provided with filter means 6 and parser 7 as discussed earlier in the application for examination of the incoming request message. In an alternative implementation the extended message is provided over the other switch ports to the control node (not shown here) (An indirect or conceptual filtering function may alternatively be provided for by the parser 7, or more generally it is merely established if additional information is contained already, or not.)

Figure 8:
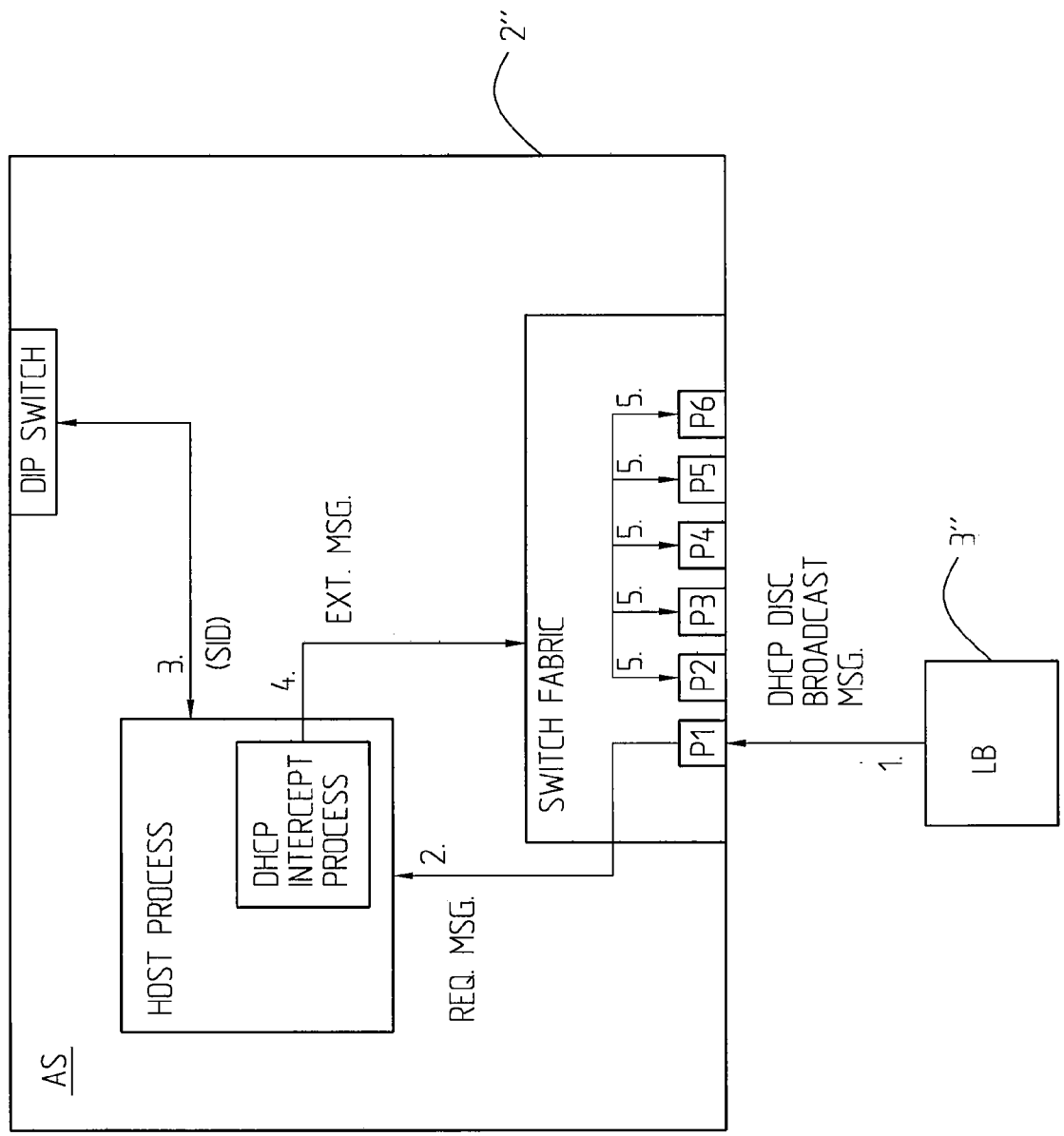

A similar procedure is described with reference to the block diagram shown in FIG. 8 showing an aggregation switch AS 2" and a line board LB 3". LB 3" here provides a DHCP discovery broadcast message to AS 2", (1.). It is provided to switch port P1 of the switch fabric. The switch fabric forwards the request message (with information that the request has been received on port P1) to host processor (2.) which carries out a DHCP intercept process including adding SID from DIP switch (3.). The hence extended message is then provided back to the switch fabric including information that the extended message should not be forwarded to port P1 (4.). It is here supposed that the control switch (not shown) receives the extended message (for mapping onto an IP address) from ports P2-P6.

In the processing means, or the host processor, the following processing occurs according to one embodiment: the DHCP request is parsed (e.g. in parsing means 7, cf. FIG. 7) to detect if option 60 (Vendor Class Identifier as described in IETF RFC (Internet Engineering Task Force Request For Comments) 2132) is present or not. If Option 60 is not present, it should be added to the list of options for identifying the switch identity and port number on which the DHCP request was received. If Option 60 already is present, its content has to be examined to determine whether the option already contains the additional information, i.e. SID and receiving port information. If not, the information should be appended to the message. If additional information already is present, no further processing should take place since additional information already has been added by another aggregation switch. Before sending the frame onto the other switch ports (i.e. not the one the request was received on, in order to avoid possible loops), the different IP checksums should be recalculated in order to avoid possible dropping of the packet (since the content has been changed).

Figure 9:
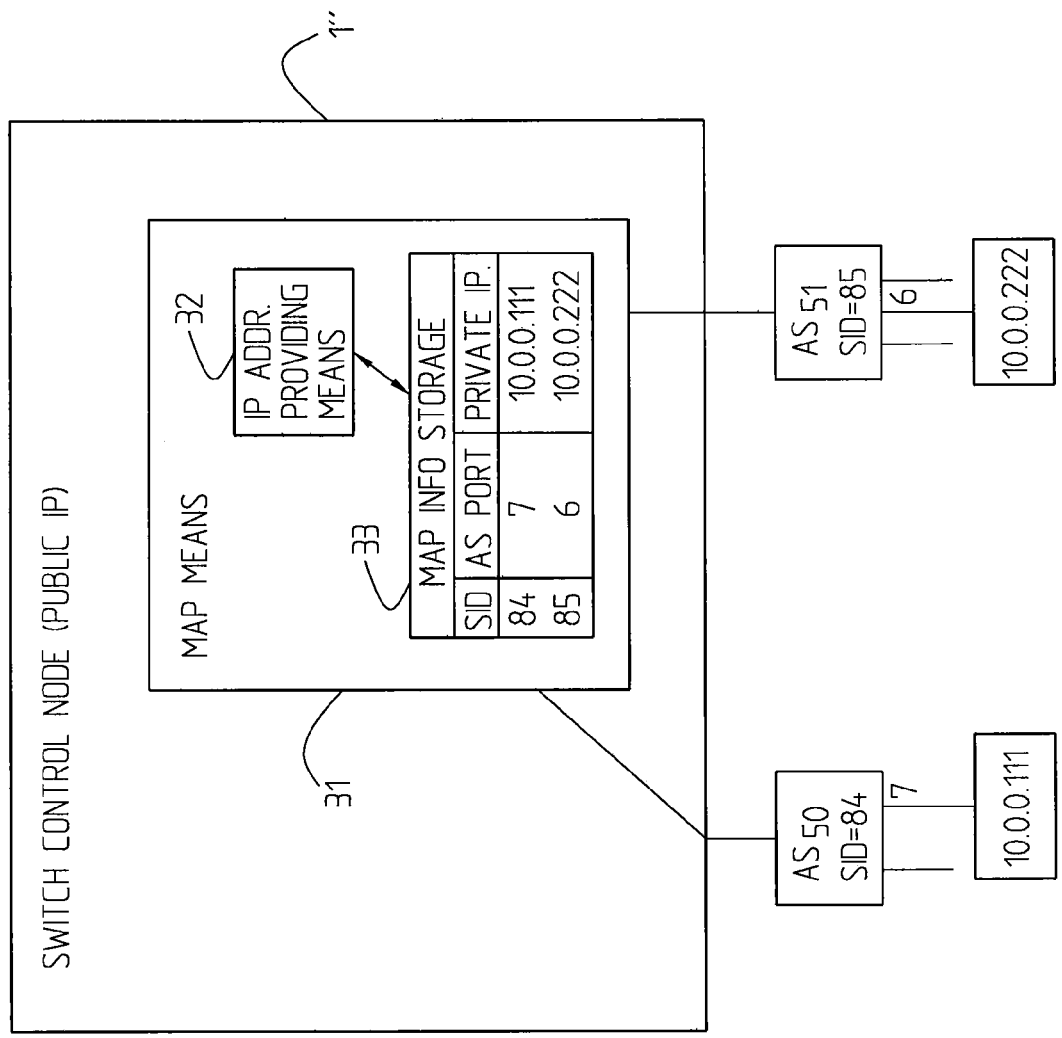
FIG. 9 is a simplified block diagram of an exemplary switching control node according to the present invention.

FIG. 9 is a schematical block diagram of a switch control node 1" in which the inventive concept is implemented. Only those parts of the switching control node which are of importance for the present invention are illustrated. The switch control node is given a public IP address. It comprises mapping means 31 including IP address providing means 32 and a mapping information storage 33. Here the switch control node controls two aggregation switches, $AS_{50}$ and $AS_{51}$. A line board is connected to port 7 of $AS_{50}$ and another line board is connected to $AS_{51}$ on port 6. It is supposed that the termination connected to port 7 of $AS_{50}$ is mapped onto private IP address 10.0.0.111 whereas the subscriber termination connected on port 6 of $AS_{51}$ is mapped onto private IP address 10.0.0.222. This information is stored in the mapping information storage 33 and can be used when management operations are to be performed on the respective subscriber.

Figure 10:
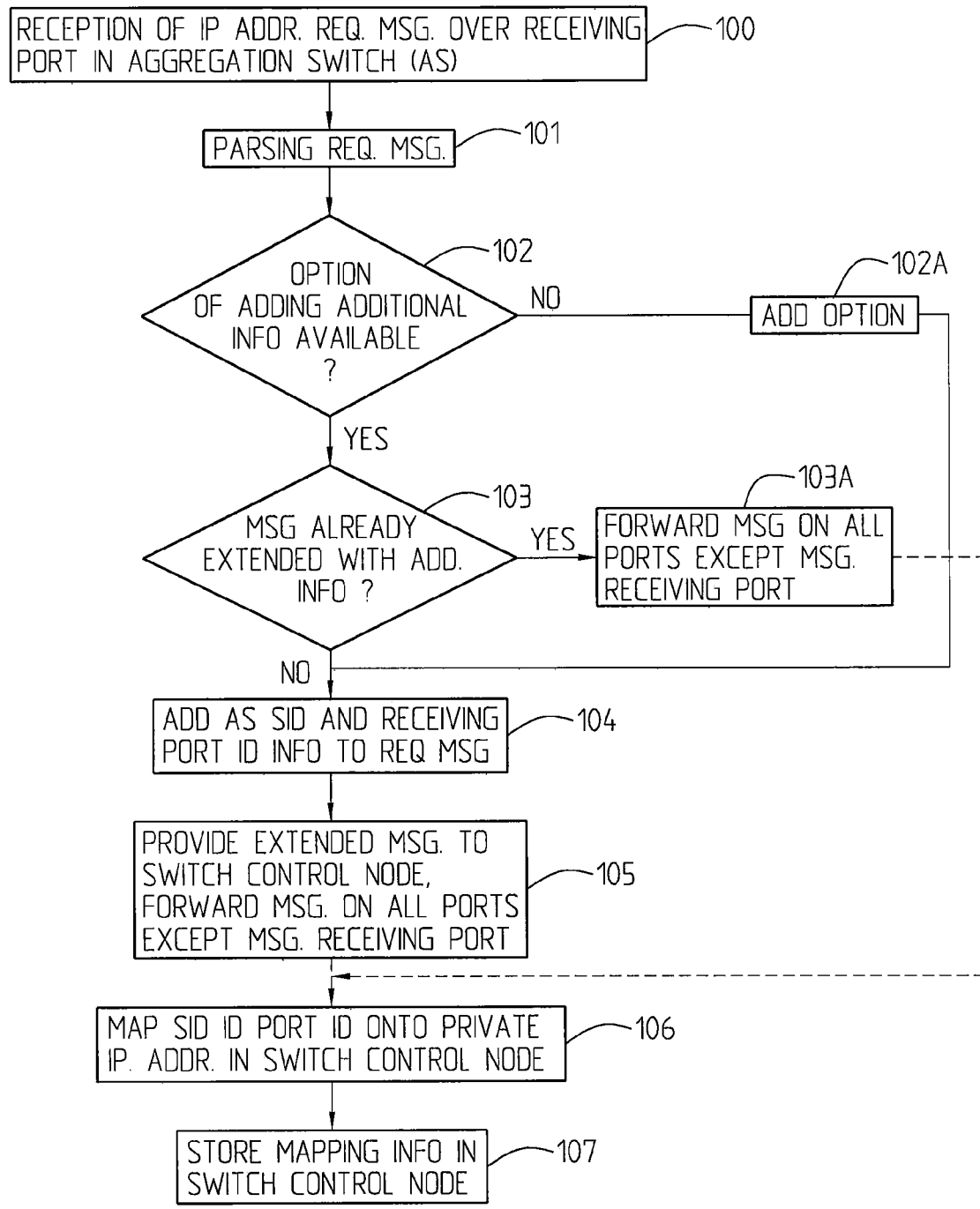
FIG. 10 is a schematical flow diagram describing one implementation of an inventive procedure.

FIG. 10 is a flow diagram describing the main steps for carrying out the inventive procedure according to one embodiment. The first step relates to reception of an IP address request message over a receiving port in an aggregation switch (AS), 100. The address request message here comprises a DHCP discovery broadcast message as discussed above. The IP address request message is then parsed in the AS, 101. It is established if an option of adding additional information is available, 102. If yes, it is established if the request message already has been extended with additional information, i.e. information relating to receiving port and unique identity of the AS, 103. If yes, the request message (with "old" additional information) is simply forwarded on all ports except the receiving port, 103A, without any processing in AS. If the option was not available in the preceding step 102, the option is added, if such a functionality of adding options is supported, 102A, and then, as well as if the message has not been extended with additional information, the additional information, particularly comprising the AS SID and receiving port identity information is added to the request message, 104. The in this way extended request message is then provided to the switch control node, 105 as well as to all other ports of the AS except for the one on which it was received. In the control node the SID and port identity related information are mapped onto a private IP address, 106. Said mapping information is then stored in the switch control node, 107, and can be used by for example management applications etc. Subsequent procedures correspond to the procedures of conventional aggregation switches and control switches. The dashed lines in FIG. 10 (between steps 105 and 106 and between steps 103A and 106) indicate that there is a change of nodes in which the procedure is carried out, but also that the steps following on the dashed lines relate to steps which are not included in the most general scope of protection of the present invention.

By adding predefined information to the DHCP request received from a lower level, the management system will be capable of identifying which subscriber terminations are associated with which IP address. Knowledge about the used topology, for example ring or star etc. is not needed by the management system to identify the subscriber terminations and the topology can be changed in any manner without requiring special actions to be taken or a new topology registration.

For each level of aggregation covered by the DHCP interception mechanism, it is possible to achieve hardware unit independency allowing easy replacement of any nodes located below.

It should be clear that the invention can be varied in a number of ways without departing from the scope of the appended claims and it is by no means restricted to the specifically illustrated embodiments.

The invention claimed is:

1. A switching node in a distributed transmission network, said switching node comprising:
   an assigned unique switching node identity (SID);
   a plurality of switch ports for connecting a plurality of line boards with subscriber line ports;
   means for detecting a request for an Internet Protocol (IP) address from a line board;
   means for identifying over which switch port the IP address request is received;
   means for generating an extended IP address request message by adding information regarding the SID and the receiving switch port over which the IP address request was received, wherein the generating means is configured to:
      determine whether an option of adding information to the request is available;
      when the option of adding information to the request is available, determine whether the request is already extended with additional information;
      when the request is already extended with additional information, forward the already extended request on all ports except the receiving port; and
      when the request is not already extended with additional information, add the information regarding the SID of the switching node and the receiving switch port to the request; and
   means for forwarding the extended request message to a switching node control unit within the switching node or to an external switching control node.

2. The switching node according to claim 1, wherein the IP address request message comprises a Dynamic Host Configuration Protocol (DHCP) request.

3. The switching node according to claim 2, wherein the means for generating an extended IP address request message includes means for implementing a DHCP Interception mechanism to provide the DHCP request with the additional information.

4. The switching node according to claim 1, wherein the detection means includes a filter for identifying IP address requests to be provided with the additional information.

5. The switching node according to claim 4, wherein the filter includes means for identifying IP address requests that are received from a line board connected to the switching node itself or IP address requests from other origins that have not already been extended.

6. The switching node according to claim 1, further comprising communication means for broadcasting the extended request message on all switch ports other than the switch port on which the request was received.

7. The switching node according to claim 1, further comprising processing means for recalculating previously calculated IP checksums.

8. The switching node according to claim 1, wherein the node comprises an aggregation switching node in an Ethernet or other network with a ring, star, daisy, or mixed topology.

9. The switching node according to claim 1, wherein the generating means also adds information about a line board port.

10. The switching node according to claim 1, further comprising:
    control means for allocating an IP address in response to the IP address request, and for mapping the additional information onto the IP address; and
    storing means for storing the mapped IP address and the additional information.

11. A transmission network, comprising:
    a plurality of switching nodes, each switching node having a unique switching node identity (SID); and
    means for controlling the switching nodes;
    wherein and each switching node includes:
       a plurality of switch ports for connecting a plurality of line boards with subscriber line ports;
       means for detecting a request for an Internet Protocol (IP) address from a line board;
       means for identifying over which switch port the IP address request is received;
       means for generating an extended IP address request message by adding information regarding the SID and the receiving switch port over which the IP address request was received, wherein the generating means is configured to:
   determine whether an option of adding information to the request is available;
   when the option of adding information to the request is available, determine whether the request is already extended with additional information;
   when the request is already extended with additional information, forward the already extended request on all ports except the receiving port; and
   when the request is not already extended with additional information, add the information regarding the SID of the switching node and the receiving switch port to the request; and
means for forwarding the extended IP address request message to the means for controlling the switching nodes; and
wherein the means for controlling the switching nodes includes:
   communication means for receiving from one of the switching nodes, the extended IP address request message;
   means, responsive to the extended IP address request message, for allocating an IP address, and for mapping the additional information onto the IP address; and
   storing means for storing the mapped IP address and the additional information.

12. The transmission network of claim 11, wherein the means for controlling the switching nodes is a standalone switching control node.

13. The transmission network of claim 11, wherein the means for controlling the switching nodes is a switching control unit implemented in one of the switching nodes.

14. A method of handling requests for an Internet Protocol (IP) address in a distributed transmission network having a switching node controller and a plurality of switching nodes, each switching node having a unique switching node identity (SID), said method comprising the steps of:
   in each switching node:
      connecting a plurality of line boards with subscriber line ports utilizing a plurality of switch ports;
      detecting a request for an IP address from a line board;
      identifying over which switch port the IP address request is received;
      generating an extended IP address request message by adding information regarding the SID and the receiving switch port over which the IP address request was received, wherein the generating step includes:
         determining whether an option of adding information to the request is available;
         when the option of adding information to the request is available, determining whether the request is already extended with additional information;
         when the request is already extended with additional information, forwarding the already extended request on all ports except the receiving port; and
         when the request is not already extended with additional information, adding the information regarding the SID of the switching node and the receiving switch port to the request; and
      forwarding the extended IP address request message to the switching node controller.

15. The method according to claim 14, further comprising the steps of:
   in the switching node controller:
      receiving the extended IP address request message;
      in response to the extended IP address request message, allocating an IP address and mapping the additional information onto the IP address; and
      storing the mapped IP address and the additional information in a memory.

* * * * *

UNITED STATES PATENT AND TRADEMARK OFFICE
CERTIFICATE OF CORRECTION

PATENT NO. : 8,363,660 B2
APPLICATION NO. : 12/513753
DATED : January 29, 2013
INVENTOR(S) : Juhl et al.

Page 1 of 1

It is certified that error appears in the above-identified patent and that said Letters Patent is hereby corrected as shown below:

Title Page, item (75), under "Inventors", in Column 1, Line 2,
delete "Jorgensen," and insert -- Jörgensen, --, therefor.

In Column 7, Line 35, delete "site 3 100" and insert -- site 3 10c --, therefor.

Signed and Sealed this
Second Day of April, 2013

Teresa Stanek Rea
*Acting Director of the United States Patent and Trademark Office*